United States Patent [19]

Grau, Jr. et al.

[11] Patent Number: 5,077,753

[45] Date of Patent: Dec. 31, 1991

[54] RADIO COMMUNICATION SYSTEM USING SPREAD SPECTRUM TECHNIQUES

[75] Inventors: Juan Grau, Jr., San Mateo; Brian S. Messenger, San Jose, both of Calif.

[73] Assignee: Proxim, Inc., Mountain View, Calif.

[21] Appl. No.: 506,476

[22] Filed: Apr. 9, 1990

[51] Int. Cl.$^5$ ............................................ H04L 27/30
[52] U.S. Cl. ............................................ 375/1; 380/34
[58] Field of Search .................. 375/121, 1; 380/34, 380/38, 39, 46

[56] References Cited

U.S. PATENT DOCUMENTS 3,980,945 9/1976 Bickford ................................ 375/1
4,797,923 1/1989 Clarke ............................ 375/121 X Primary Examiner—Bernarr E. Gregory

[57] ABSTRACT

A spread spectrum radio communication system includes a generator for generating a pseudo-random chipping sequence, a frequency spreader for combining digital data with the pseudo-random chipping sequence to produce a spread spectrum signal, a modulator for modulating the spread spectrum signal for broadcasting over a predefined frequency band, a demodulator for demodulating broadcast spread spectrum signals, a de-spreader that employs single bit quantization and oversampling for digitally correlating the output of the demodulator means with a pseudo-random chipping sequence, and an extractor for extracting clock and data signals from the output of the de-spreader. The chipping sequence is normally selected from a set of codes including an eleven-bit Barker code, its inverse and reversals of the inverse and non-inverse code.

21 Claims, 5 Drawing Sheets

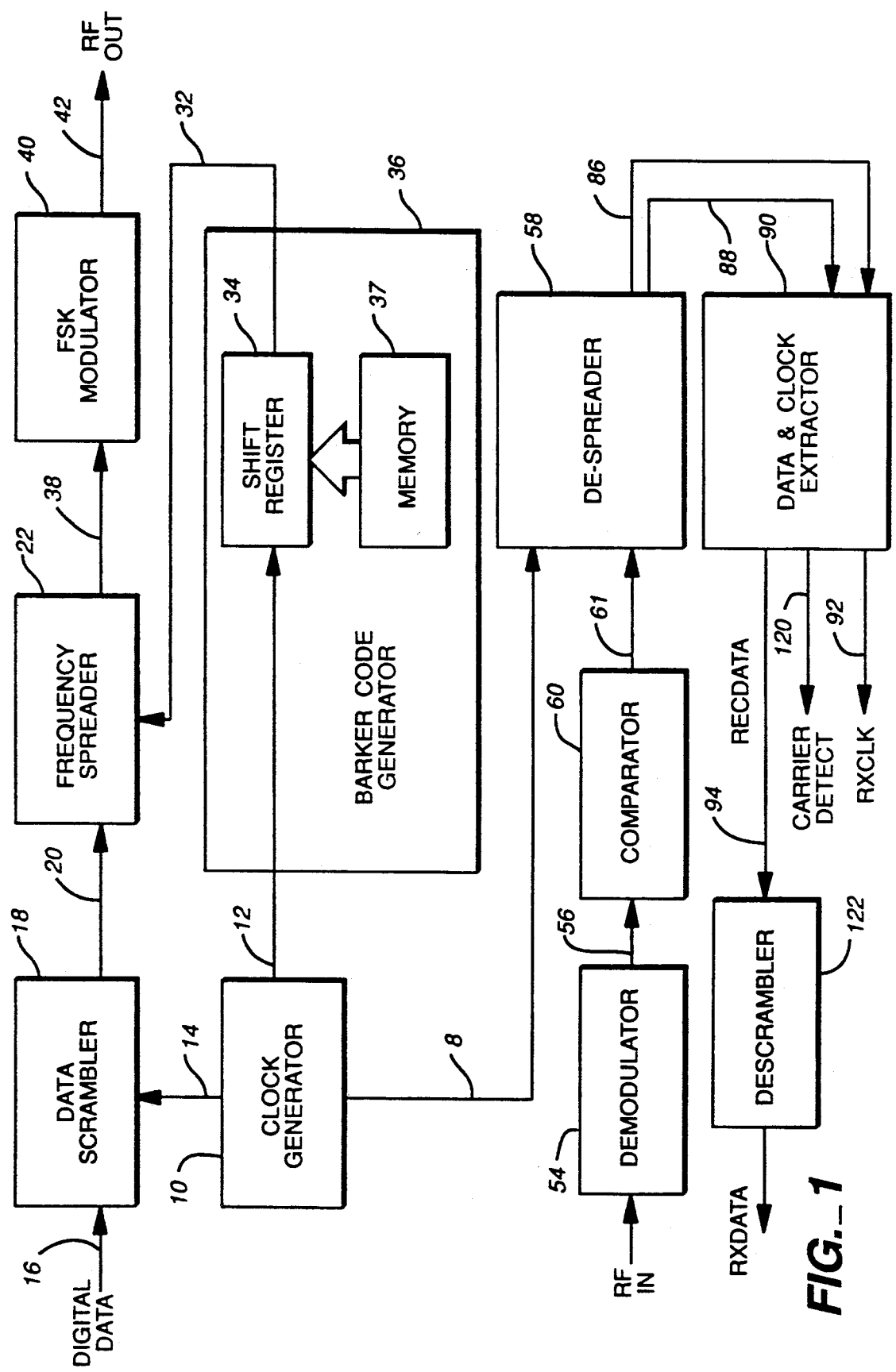
FIG._1

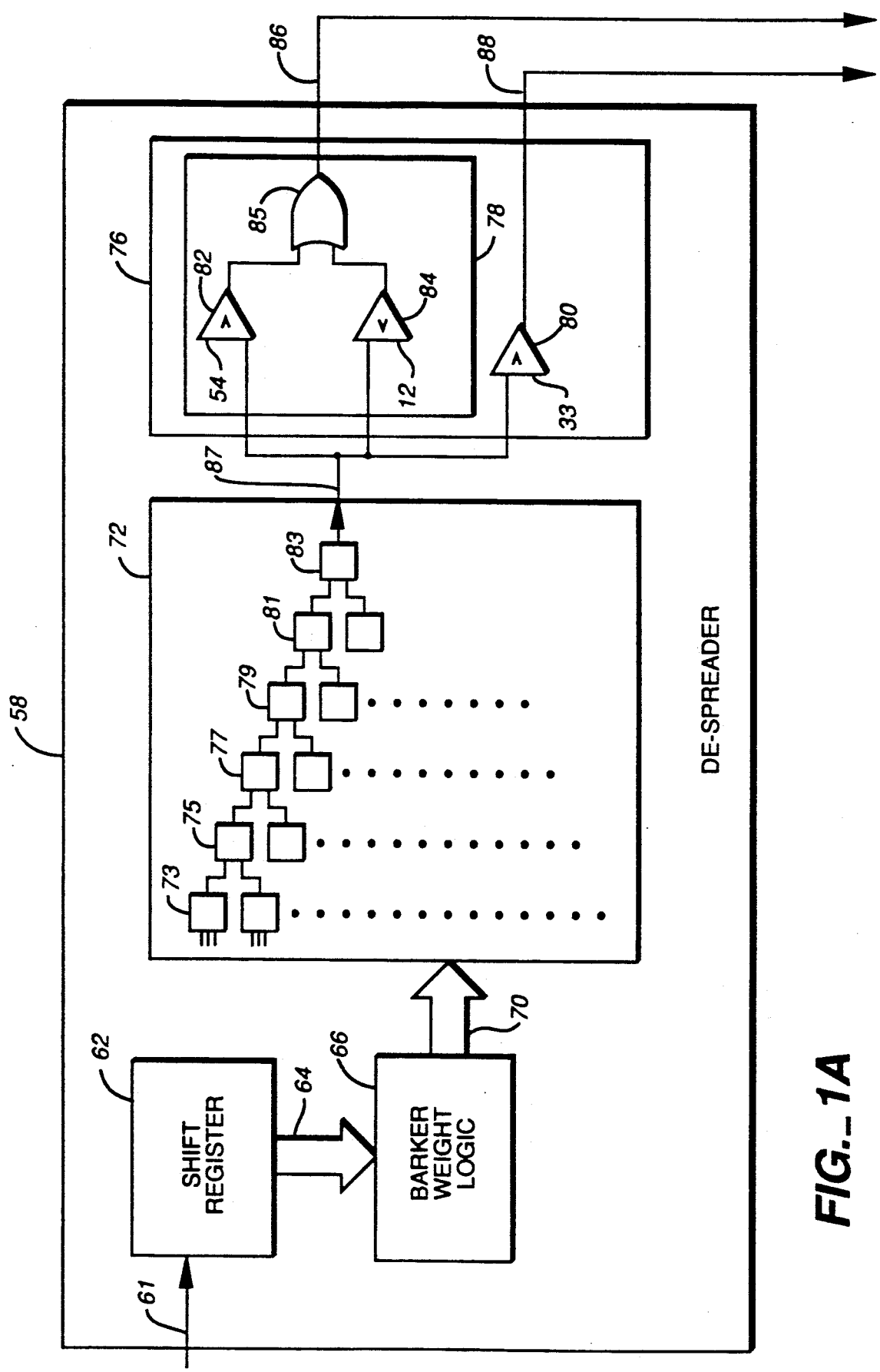
FIG._1A

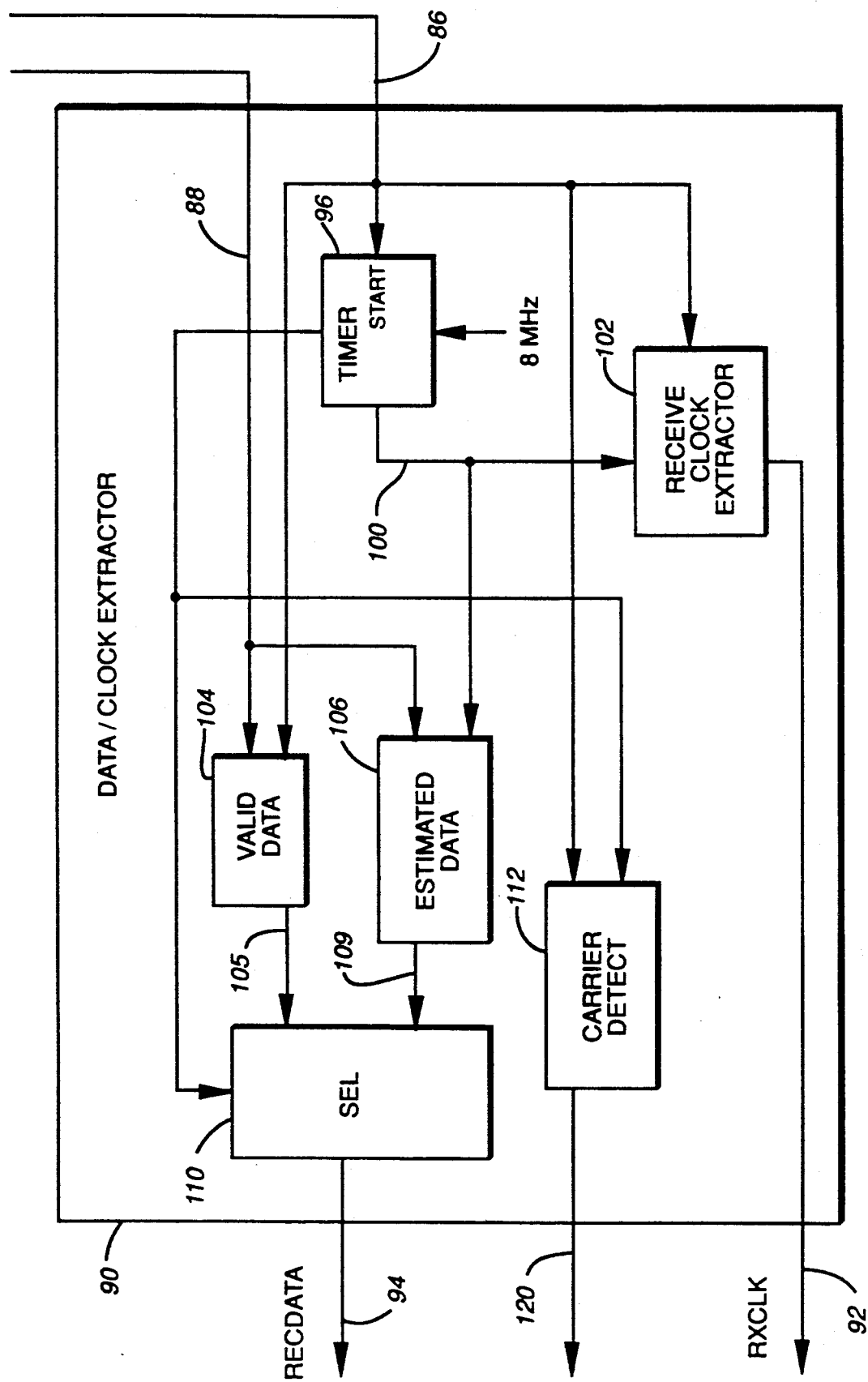
FIG._1B

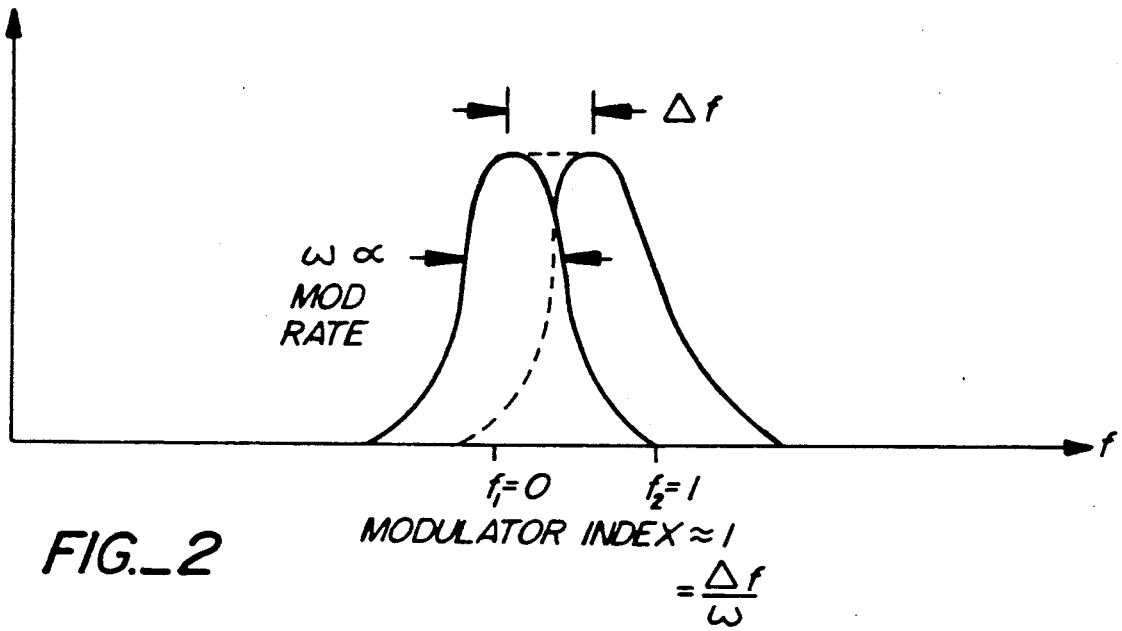
FIG._2
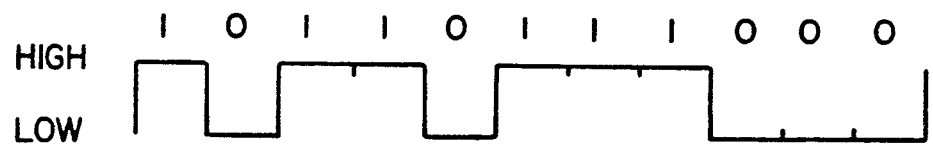
FIG._4   BARKER CODE

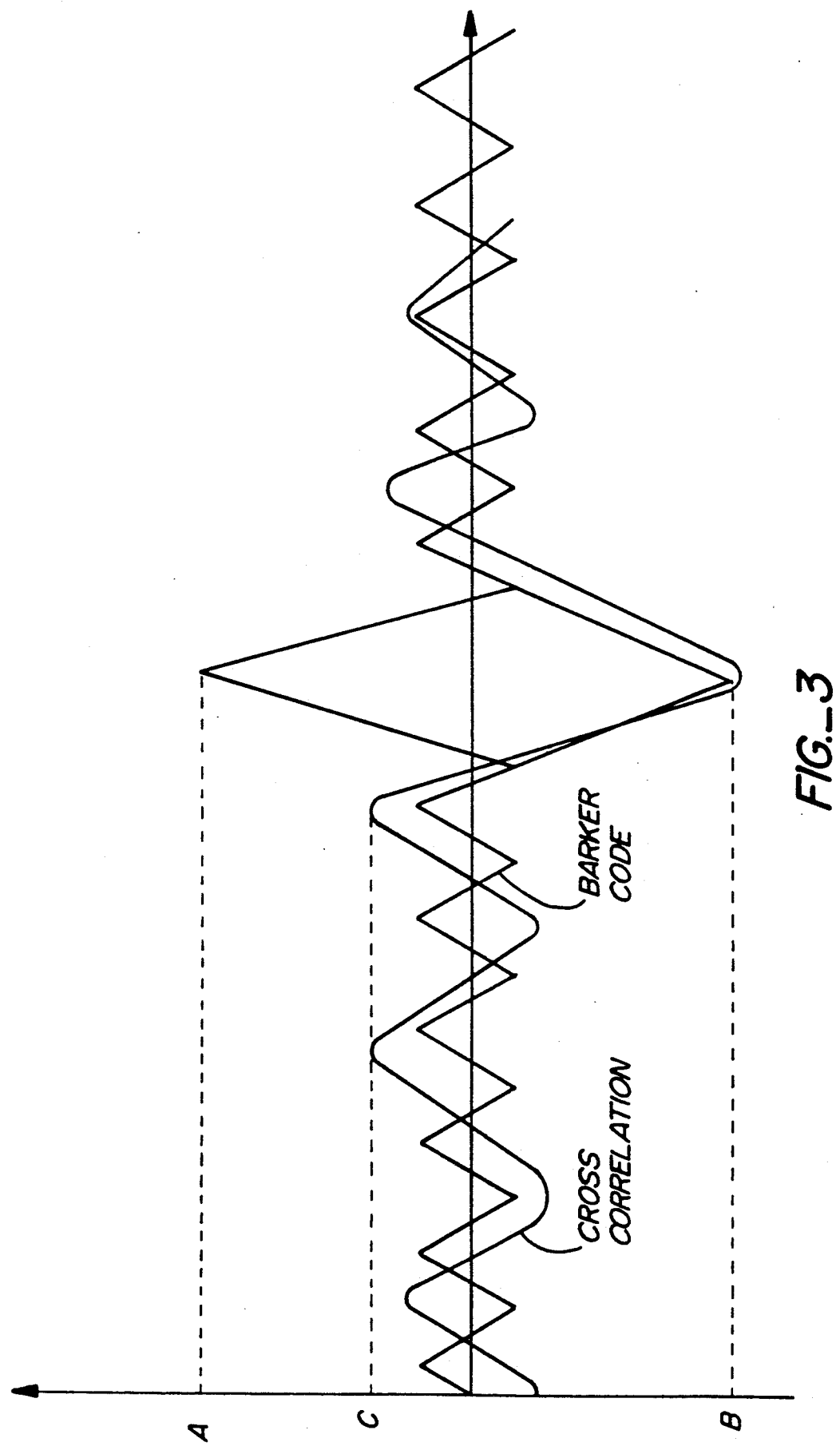
FIG._3

RADIO COMMUNICATION SYSTEM USING SPREAD SPECTRUM TECHNIQUES

BACKGROUND OF THE INVENTION

1. Field of the Invention

The present invention generally relates to radio communication systems and, more particularly, to radio communication systems using spread spectrum techniques.

2. State of the Art

In radio communication systems, the term "spread spectrum" refers to techniques whereby radio signals that are assigned to narrow frequency bands (i.e., spectrums) are distributed over broader frequency bands. Consequently, spread spectrum broadcasts provide signals that have relatively wide frequency bands but relatively low power densities. One effect of frequency spreading is to reduce the power peaks in the operating frequency band and, thereby, to reduce the potential for interference with other nearby communication systems operating in the sam frequency band.

In conventional practice, frequency spreading is accomplished by multiplying a modulated signal by a second signal that comprises a spreading code. Accordingly, in spread spectrum broadcasting, only receivers that have knowledge of the spreading code being used by a particular transmitter will be able to intelligibly receive (i.e., decode) spread spectrum broadcasts from that transmitter. Stated conversely, a spread spectrum receiver will reject all broadcast signals that are not encoded with the spreading code which is used by the receiver.

In spread spectrum communication systems, the information transferred between transmitter/receiver units necessarily includes pattern synchronization information as well as data. The pattern synchronization information is needed for synchronizing receivers and transmitters to the spreading code to be used. Without synchronization, data could not be accurately recovered by a receiver.

It should be understood, however, that time must be spent by receivers to synchronize, or "lock-up," to the spreading code used by a transmitter. In practice, the greater the synchronization period, the lower the overall data throughput between a spread spectrum transmitter and receiver.

SUMMARY OF THE INVENTION

Generally speaking, the present invention provides an improved spread spectrum communication system that requires substantially less synchronization time than conventional systems.

In the preferred embodiment of the present invention, a transmitter system for use with a spread spectrum radio communication system includes generator means for generating a pseudo-random chipping sequence, frequency spreader means for combining digital data with the pseudo-random chipping sequence to produce a spread spectrum signal, and modulator means for modulating the spread spectrum signal over a predefined frequency band. Thus, in the preferred embodiment of the present invention, a spreading function is applied to digital data prior to modulation. In practice, the spreading function is an eleven-bit Barker code having the binary bit sequence 10110111000, its inverse sequence, 01001000111, or reversals of the inverse and non-inverse code (i.e., 11100010010 and 00011101101, respectively).

Also in the preferred embodiment of the present invention, a receiver system for use with a spread spectrum radio communication system includes demodulator means for demodulating broadcast spread spectrum signals; de-spreader means employing single bit quantization and oversampling for digitally correlating the output of the demodulator means with a pseudo-random chipping sequence; and extractor means for extracting clock and data signals from the output of the de-spreader means. Also, in the case where the transmitter includes a scrambler, the receiver system includes de-scrambler means for de-scrambling the extracted data to recover the digital data in a spread spectrum broadcast. As in the receiver system, the chipping sequence used by the de-spreader is the eleven-bit Barker code, its inverse, and reversals of the inverse and non-inverse code.

BRIEF DESCRIPTION OF THE DRAWINGS

The present invention can be further understood with reference to the following description in conjunction with the appended drawings, wherein like elements are provided with the same reference numerals. In the drawings:

FIG. 1 is a schematic block diagram of a transmitter and receiver system according to the present invention;

FIG. 1(A) is schematic block diagram of a de-spreader for use in the receiver system of FIG. 1;

FIG. 1(B) is schematic block diagram of a data and clock extractor circuit for use in the receiver system of FIG. 1;

FIG. 2 is a diagram showing examples of frequency shifted data signals provided by the system of FIG. 1;

FIG. 3 is a diagram showing examples of waveforms associated with a spreading sequence provided by the system of FIG. 1; and FIG. 4 is a diagram that shows the waveform of an eleven-bit Barker code. cDETAILED DESCRIPTION OF THE PREFERRED EMBODIMENTS Generally speaking, FIG. 1 shows a transmitter for use with spread spectrum radio communication systems for broadcasting data obtained from a digital computer or the like. In the illustrated embodiment, the transmitter includes a digital data scrambler 18 that receives and scrambles the obtained digital data. The scrambler 18 can include, for example, a five-stage linear feedback shift register.

Further in the transmitter system shown in FIG. 1, a master clock generator 10 provides divided clock signals, herein referred to as the chip clock and the bit clock signals, respectively, on lines 12 and 14. In the preferred embodiment, the master clock generator output oscillates at eight megahertz (MHz), the chip clock signal on line 12 is the master clock signal divided by six, and the bit clock signal on line 14 is the master clock signal divided by sixty-six. It should be noted that the bit clock signal is provided for clocking the scrambler 18.

Still further, the transmitter system in FIG. 1 includes a frequency spreader 22 that receives scrambled digital data from scrambler 18 via line 20 . As will be described below, frequency spreader 22 combines the scrambled data with a "chipping" sequence to produce a spread spectrum signal. Preferably, the data and chipping sequence are combined via an exclusive-OR gate. In the illustrated embodiment, the chipping sequence signals are obtained from a binary code generator 36 via a line 32.

Generally speaking, the binary code generator 36 in FIG. 1 operates to generate the chipping sequence in the form of a pseudo-random code. In the illustrated embodiment, generator 36 comprises a shift register 34 which is parallel loaded from a memory 37 that contains a predetermined chipping sequence. It should be noted that the shift register 34 is clocked by the chip clock signal and, accordingly, shifts out the chipping sequence at the rate of the chip clock.

The chipping sequence, as shown in FIG. 4, preferably is an eleven-bit Barker code (i.e., is the binary bit sequence 10110111000). However, the chipping sequence can equivalently be the inverse of that code (i.e., 01001000111) or reversals of the inverse and non-inverse code (i.e., 11100010010 and 00011101101, respectively). Workers skilled in the art will recognize that the eleven-bit Barker code has excellent AC coupling characteristics because, being comprised of five binary zero bits and six binary one bits, its DC component is small. Also, the eleven-bit Barker code is advantageous because its spectral components are fairly random.

Finally, the transmitter system in FIG. 1 includes a modulator 40. In practice, modulator 40 is of the frequency shift keying (FSK) type. The modulator is driven by the spread spectrum signals to produce a radio-frequency (RF) output 42. It should be noted that the modulation rate corresponds to the chipping rate.

The complete operation of the transmitter system of FIG. 1 can now be understood. The operation of the system is initiated when data scrambler 18 obtains and scrambles digital data. Then, frequency spreader 22 combines the scrambled digital data with the selected chipping sequence at a chipping rate which is eleven times the bit rate. Thus, as each bit in a sequence of scrambled data is conveyed to the X-OR logic in the spreader, the scrambled data is combined with the eleven-bit Barker code such that, when a given bit equals a binary "0", the complete eleven-bit Barker code is generated at the output of the spreader (i.e., line 38). On the other hand, if a given data bit equals a binary "1", then the complete inverse Barker code is generated at the spreader output.

At this juncture, it should be appreciated that the above-described eleven-bit Barker code represents a relatively short spreading sequence and, therefore, can be represented in the frequency domain by a relatively limited number of spectral lines or frequency components. Accordingly, if the data is not changing significantly (e.g. if the data is all binary "1's" or all binary "0's"), the power of the transmission signal is distributed among relatively few frequency components, resulting in a relatively high energy level per component. It can also be appreciated that, because scrambler 18 distributes digital data over the entire frequency band in which the communication system operates, it effectively increases the length of the spreading sequence.

As mentioned above, modulator 40 employs FSK modulation techniques for modulating the spread spectrum signals. Examples of two FSK frequencies are shown in FIG. 2. In practice, the difference between the values of the FSK frequencies used to represent a binary 0 and a binary 1 is referred to as the frequency deviation (represented by delta f in the drawings). The bandwidth, w, associated with the each of the discrete frequencies is determined by the rate at which digital data is transmitted.

The preceding completes the description of the transmitter system shown in FIG. 1. In the following, the receiver system in FIG. 1 will be described. It should be understood, however, that transmitters and receivers normally are combined in single units. Thus, during one time period, a first transmitter/receiver unit can broadcast digital data to a second receiver/transmitter unit; then, during a subsequent time period, the second transmitter/receiver unit can broadcast binary data to the first receiver/transmitter unit.

In the receiver system shown in FIG. 1, broadcast data is received by a conventional frequency demodulator 54 which converts frequency values to voltage signals. In practice, the demodulator output is provided to a digital comparator 60. The comparator compares the voltages to a predetermined threshold value that determines whether a given output of demodulator 54 should be interpreted as a binary "1" or as a binary "0".

Further, the receiver system in FIG. 1 includes a de-spreader 58 that employs single bit quantization and oversampling techniques for digitally correlating demodulated signals with a pseudo-random chipping sequence. In practice, the de-spreader uses the same chipping sequence as the transmitter (i.e., the eleven-bit Barker code). Also in practice, each chip of the eleven-bit Barker code is sampled six times in order to provide a measure of immunity to clock inaccuracies and jitter.

As shown in more detail in FIG. 1(A), de-spreader 58 includes means for delaying the demodulated signals to create blocks of binary data in each binary data bit. Preferably, the delay means includes a shift register 62 for storing the information associated with each block of the eleven-bit Barker code. It should be understood that shift register 62 is driven by clock signals having the same frequency as those provided by the above-discussed master clock generator 10. In practice, the shift register 62 has sixty-six output lines, collectively designated by the number 64 in the drawing, that simultaneously receive data shifted through the register.

As also shown in FIG. 1(A), de-spreader 58 includes a digital weighting device (i.e., a multiplier) the individual output lines of shift register 62. The logic employed by the weighting device 66 can be, for example, an array of invertor gates with one such gate connected to each stage of the shift register which is low (i.e., a binary "0") when the eleven-bit Barker code is properly aligned in the shift register. As so configured, the weighting device would weight six samples of each Barker chip stored in the shift register 62 using the eleven-bit Barker code sequence. Accordingly, if an interference-free binary "1" (represented by the non-inverse Barker code) were provided to weighting device 66, the device would produce a sixty-six bit string of 1's by inverting the appropriate bits; on the other hand, if an interference-free binary "0" were provided, the device would produce a string of sixty-six binary "0's" by inverting the same bits.

As still further shown in FIG. 1(a), de-spreader 58 includes a pipelined adder 72 that operates upon the output of weighting device 66 for providing a value that represents the number of binary "1" inputs among the outputs from the weighting device. In the illustrated embodiment, pipelined adder 72 includes a first set of adders 74, each of which receives three inputs on three of the lines 70 to provide a two-bit result (representing the number of high inputs). Pairs of the two-bit results are combined in a series of adders 76 to provide three-bit results, and so forth. Finally, two six-bit results are combined into a single seven-bit result. That is, the pipelined adder provides a 7-bit summation by receiving sixty-six bits and resolving those bits into a single seven-bit output which has a value between zero and sixty-six.

At this juncture, it should be noted that de-spreader 58 operates to spread interference signals which may combine with data during transmission. This has the effect of substantially reducing the amplitude of the interference signals at any given point of the frequency spectrum. Thus, in a sense, de-spreader 58 represents a matched filter. Ultimately, the frequency spreading of interference signals enhances the detection of data components in demodulated signals.

FIG. 3 is a representation of a typical output of de-spreader 58. As mentioned above, the maximum magnitude of the output is sixty-six, and the minimum magnitude is zero. In the drawing, the value "A" is the "main lobe" value obtained when the eleven-bit Barker code is perfectly correlated with itself (i.e., the auto-correlation case). The value "B" is the correlation value obtained when the non-inverse eleven-bit Barker code is cross-correlated with the inverse Barker code. The values "C" are side-lobe correlation values obtained when correlation calculations are made for two codes that are not exactly aligned. It should be understood that interference will cause the main-lobe values A or B to decrease, and will cause the side-lobe values C to increase.

As further shown in FIGS. 1 and 1(B), the receiver system includes a clock and data extractor 76 that operates upon the correlated signals provided by de-spreader 58. In the illustrated embodiment, extractor 76 includes a window comparator 78 and a magnitude comparator 80. The window comparator includes two digital comparators 82 and 84, and an OR-gate 85. As will now be explained, window comparator 78 operates to indicates whether the 7-bit output of pipelined adder 72 has a value greater or less than a predetermined threshold value, thereby providing immunity to interference effects in de-spreader 58. In practice, an upper threshold value is established for comparator 82 and a lower threshold value is established for comparator 84. Accordingly, if the magnitude of a signal received by window comparator 78 is greater than the upper threshold value or less than the lower threshold value, then OR-gate 85 produces an output that will be referred to in the following as a "valid" signal; that is, the valid signal indicates that a binary "0" or a binary "1" has been accurately detected by de-spreader 58.

The purpose of magnitude comparator 80 in the system of FIG. 1(B) is to determine whether the output of pipelined adder 72 is above or below a pre-determined mid-range value. More particularly, comparator 80 produces a binary "1" on line 88 if the adder output is above the mid-range threshold, and produces a binary "0" if the adder output value is below the mid-range threshold. Thus, if a received signal were peaking high on line 75 at a correlation time determined by window comparator 78, the data bit produced by comparator 80 would be a binary "1". On the other hand, if the signal on line 75 were peaking low at a correlation time determined by window comparator 78, the digital data output represented by the signal on line 88 would be a zero.

Still further in the system of FIG. 1(B), a data extractor 90 is provided for extracting clock and data signals from the output of the de-spreader means. As shown, the data extractor provides a received clock signal RXCLK and a received data signal RECDATA on lines 92 and 94, respectively. In the illustrated embodiment, the data extractor 90 includes a timer 96 which is started by the valid signal on line 86. In practice, timer 96 places a signal on line 100 at a time which corresponds to "n" chips following the start time of the timer, with the number "n" corresponding to the number of chips in the chipping sequence (e.g., eleven chips in the case of the eleven-bit Barker code). In a sense, then, timer 96 is a flywheel-like circuit which is started upon receiving a valid signal, and automatically reloads itself if its count expires prior to its receiving a valid correlation pulse. In other words, if a valid correlation pulse is not received by timer 96 within an expected period because, for example, of excessive noise on a signal, the timer output allows operation to continue.

Still further, the system in FIG. 1(B) includes a receive clock extraction circuit 102 that operates upon the timer output signal on line 100 and the valid signal on line 86, and produces the above-mentioned RXCLK signal. More particularly, the circuit 102 is constructed to expect a correlation pulse on line 86 within a predetermined period and, if the expected correlation pulse is not received, the circuit 102 uses the timer signal on line 100 for generating the RXCLK signal. In the illustrated embodiment, the data extractor 90 includes sample data blocks 104 and 106. The sample data block 104 receives signals on lines 86 and 88, respectively, and provides a "valid data" output signal on line 108 in response to the receipt of the valid correlation pulse on line 86. The sample data block 106 receives the data output on line 88 and the timer output on line 100, and provides an "estimated data" signal on line 109 at the time a correlation pulse on the valid data line 86 was expected to occur.

Also, the system in FIG. 1(B) includes a selection circuit 110 that receives outputs from the sample data blocks 104 and 106 and provides the RECDATA signal on line 94. In the preferred embodiment, selection circuit 110 operates such that, if a valid correlation signal occurs within a predetermined window period, the output from sample data block 106 is chosen. However, if a valid correlation pulse is not provided to selection circuit 110, selection circuit 110 selects the estimated data after a brief delay (i.e., the window period).

Finally, the system in FIG. 1(B) includes a carrier detection circuit 112 for generating a carrier detect signal that indicates that a valid signal has been received by the receiver system. In practice, the carrier detect signal is based upon counting the number of valid data values selected by the selection circuit 110. In the preferred embodiment, a count of seven or more valid data bits within the last fifteen consecutive bit periods results in a carrier detect output signal.

The output of the receiver in FIG. 1 is provided by a de-scrambler 122 for unscrambling received data signals. In the illustrated embodiment, de-scrambler 122 receives the RECDATA signal on the line 94 and the RXCLK on line 92, and provides unscrambled data (i.e., the signal RXDATA). In recovering the original data, de-scrambler 122 performs a function which is the inverse of the function of the above-discussed scrambler 18.

The foregoing has described the principles, preferred embodiments and modes of operation of the present invention. However, the invention should not be construed as limited to the particular embodiments discussed. Instead, the above-described embodiments should be regarded as illustrative rather than restrictive. For example, in the foregoing description, particular reference has been made to a master clock rate of eight MHz; however, other clock rates can be employed with similar results. As another example, particular reference has been made to the case where the spreading sequence is an eleven-bit Barker code; however, other spreading sequences might be used. Similarly, the thresholds for bit extractor 76 need not be fixed but, instead, could be variable. As another example, although pipelined adder 72 is shown as being implemented digitally, it could be of analog design.

Similarly, other parameters can be chosen differently from the above-described embodiments without affecting the essential operation of the system. Such parameters, for instance, include the clock rate, the over-sampling rate, and threshold levels such as the carrier detect threshold levels.

Thus, it should be appreciated that workers skilled in the art may make variations in the above-described embodiments without departing from the spirit and scope of present invention as defined by the following claims.

What is claimed is:

1. A transmitter system for use with a spread spectrum radio communication system, comprising:
   generator means for generating a pseudo-random chipping sequence;
   frequency spreader means for combining digital data with the pseudo-random chipping sequence to produce a spread spectrum signal; and,
   modulator means for modulating the spread spectrum signal over a predefined frequency band.

2. A system according to claim 1 wherein the pseudo-random chipping sequence is an eleven-bit Barker code.

3. A system according to claim 2 wherein the modulator means is of the frequency shift keying type and is driven by the spread spectrum signals to produce a radio-frequency output for broadcasting.

4. A system according to claim 2 wherein the frequency spreader means includes an exclusive-OR gate means for receiving the scrambled data from the scrambler means and the pseudo-random code signals from the generator means, and for providing the input to the modulator means.

5. A system according to claim 1 further including scrambler means for scrambling the digital data prior to the data being operated upon by the frequency spreader means.

6. A system according to claim 5 wherein the pseudo-random chipping sequence is an eleven-bit Barker code.

7. A transmitter system for use with a spread spectrum radio communication system, comprising:
   generator means for generating a pseudo-random chipping sequence;
   frequency spreader means for combining digital data with the pseudo-random chipping sequence to produce a spread spectrum signal; and,
   modulator means for modulating the spread spectrum signal over a predefined frequency band wherein the pseudo-random chipping sequence is one of a set of codes including non-inverse eleven-bit Barker code, an inverse of the Barker code and a reversed sequence of the inverse or non-inverse Barker code.

8. A system according to claim 7 wherein the eleven-bit Barker code has the non-inverse binary bit sequence 10110111000, the inverse sequence 01001000111, and the reversed sequences of the inverse and non-inverse code are 11100010010 and 00011101101, respectively.

9. A system for receiving spread spectrum radio communication signals, including digital data signals, comprising:
   demodulator means for demodulating broadcast spread spectrum signals;
   de-spreader means employing single bit quantization and oversampling for digitally correlating the output of the demodulator means with a pseudo-random chipping sequence; and
   extractor means for extracting clock and data signals from the output of the de-spreader means.

10. A system according to claim 9 further including de-scrambler means for de-scrambling the extracted data to recover the digital data in a spread spectrum broadcast.

11. A system for receiving spread spectrum radio communication signals, including digital data signals, comprising:
    demodulator means for demodulating broadcast spread spectrum signals;
    de-spreader means employing single bit quantization and oversampling for digitally correlating the output of the demodulator means with a pseudo-random chipping sequence; and
    extractor means for extracting clock and data signals from the output of the de-spreader means wherein the chipping sequence used by the de-spreader is the eleven-bit Barker code, an inverse of the eleven-bit Barker code, and reverse sequences of the inverse and non-inverse Barker code.

12. A system for receiving spread spectrum radio communication signals, including digital data signals, comprising:
    demodulator means for demodulating broadcast spread spectrum signals;
    de-spreader means employing single bit quantization and oversampling for digitally correlating the output of the demodulator means with a pseudo-random chipping sequence; and
    extractor means for extracting clock and data signals from the output of the de-spreader means, wherein the de-spreader means further includes;
    means for digitally over-sampling and delaying a demodulated signal to create blocks of over-sampled data for each binary data bit of the demodulated signal;
    means for digitally multiplying the blocks over-sampled data with the pseudo-random chipping sequence;
    means for digitally summing the blocks of multiplied, over-sampled data into a summation value; and,
    means for digitally comparing the summation value with predetermined thresholds.

13. A system according to claim 12 wherein the chipping sequence used by the de-spreader is the non-inverse eleven-bit Barker code, an inverse of the eleven-bit Barker code, and reversed sequences of the inverse and non-inverse Barker code.

14. A system according to claim 13 wherein the delay means includes a shift register for storing the oversampled demodulated signal.

15. A system according to claim 12, wherein the comparing means includes:
    a first digital comparator for producing an output signal indicative of whether the summation value is outside a window defined by a predetermined upper and lower threshold value; and, a second digital comparator for producing an output signal indicative of whether the summation value is lesser or greater than a predetermined midpoint threshold value.

16. A system according to claim 15 wherein the extractor means operates to produce a binary data signal from the second digital comparator output if the first digital comparator output signal indicates that the summation value is outside the predetermined thresholds.

17. A system according to claim 16 wherein the extractor means further operates to produce a binary data signal from the second digital comparator output even if the first digital comparator output indicates that the summation value is not outside the predetermined thresholds.

18. A system according to claim 17 further including a carrier detect means that uses the output of the first digital comparator for detecting the presence of a valid received signal.

19. A spread spectrum radio communication system, comprising:

generator means for generating a pseudo-random chipping sequence;

frequency spreader means for combining digital data with the pseudo-random chipping sequence to produce a spread spectrum signal;

modulator means for modulating the spread spectrum signal for broadcasting over a predefined frequency band;

demodulator means for demodulating broadcast spread spectrum signals;

de-spreader means employing single bit quantization and oversampling for digitally correlating the output of the demodulator means with a pseudo-random chipping sequence; and extractor means for extracting clock and data signals from the output of the de-spreader means.

20. A spread spectrum radio communication system, comprising:

generator means for generating a pseudo-random chipping sequence;

frequency spreader means for combining digital data with the pseudo-random chipping sequence to produce a spread spectrum signal;

modulator means for modulating the spread spectrum signal for broadcasting over a predefined frequency band;

demodulator means for demodulating broadcast spread spectrum signals;

de-spreader means employing single bit quantization and oversampling for digitally correlating the output of the demodulator means with a pseudo-random chipping sequence; and extractor means for extracting clock and data signals from the output of the de-spreader means, wherein the pseudo-random chipping sequence is selected from a set of codes including a non-inverse eleven-bit Barker code, an inverse of the eleven-bit Barker code and reversed sequences of the inverse and non-inverse Barker code.

21. A system according to claim 20 further including de-scrambler means for de-scrambling the extracted data to recover the digital data in a spread spectrum broadcast.

* * * * *